Figure 1:
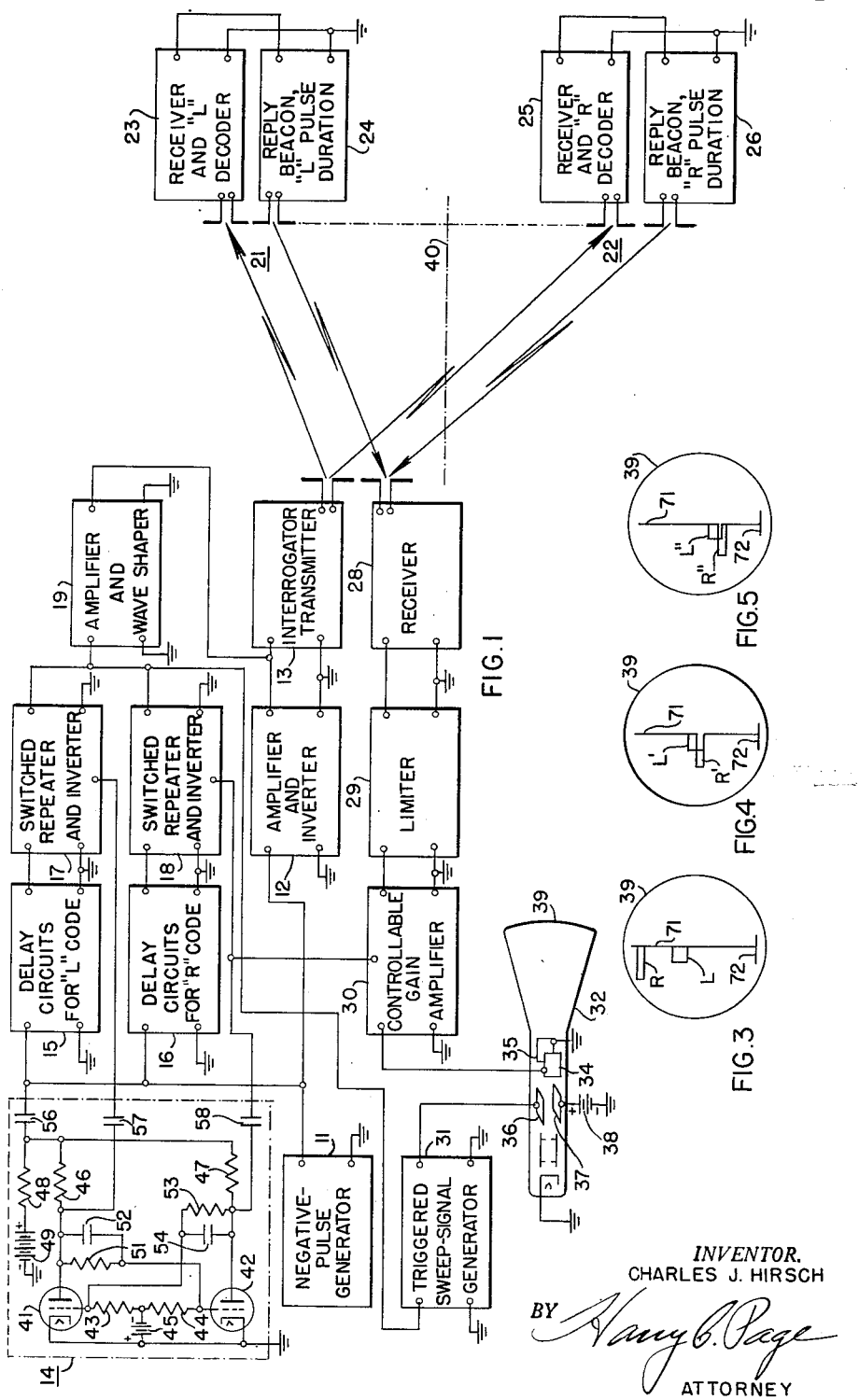

March 18, 1952  C. J. HIRSCH  2,589,808
TRANSPONDER SYSTEM
Filed Oct. 21, 1946  2 SHEETS—SHEET 1

INVENTOR.
CHARLES J. HIRSCH
BY
ATTORNEY

March 18, 1952     C. J. HIRSCH     2,589,808
TRANSPONDER SYSTEM
Filed Oct. 21, 1946     2 SHEETS—SHEET 2

INVENTOR.
CHARLES J. HIRSCH
BY
ATTORNEY

Patented Mar. 18, 1952

2,589,808

UNITED STATES PATENT OFFICE 2,589,808

TRANSPONDOR SYSTEM

Charles J. Hirsch, Douglaston, N. Y., assignor to Hazeltine Research, Inc., Chicago, Ill., a corporation of Illinois Application October 21, 1946, Serial No. 704,581

6 Claims. (Cl. 343—11)

1

This invention relates to an improved transpondor system, and particularly to such a system for indicating the direction followed by a mobile object in which two or more beacons are interrogated to obtain from them direction or course information or other position information.

To obtain information regarding the position of a mobile object such as an aircraft it has been proposed to establish at points on the ground spaced a known distance apart, as may be shown on appropriate charts, two radio beacons of the transpondor type. Transpondor beacons are wave-signal beacons equipped to receive interrogating signals and to transmit response signals in reply thereto. When suitable interrogating equipment located on the mobile object is placed in operation, a series of interrogating signals is transmitted from the mobile object. Each of these interrogating signals is answered by response signals from both of the beacons. Associated with the interrogating equipment on the mobile object is a display device for indicating the times of arrival of the response signals at the mobile object. In producing such indications it is customary to use a time base which conveniently may be formed by developing a sweep signal having a magnitude increasing linearly with time and by applying this sweep signal to sweep an indicating beam across a display surface. The time base is formed in the period following the transmission of each one of the series of interrogating signals. When, during each of these periods, the two response signals from the two beacons are intercepted at the mobile object, they produce indications which are separated on the line of sweeping across the display surface by a distance proportional to the difference in the times taken by the signals to travel from the mobile object to each of the beacons respectively and back to the object.

It frequently is desirable, however, to control the motion of the mobile object so that it remains in or near a plane containing the perpendicular bisectors of a line connecting the two beacons. The beacons may be located, for example, so that this plane includes the approach path followed by an aircraft preparing to land at an airport. When located on this plane the aircraft is equidistant from the two beacons and receives the two response signals at the same instant, provided that the two transpondor beacons respond to interrogating signals with no delay or with equal delays. If unequal delays are introduced at the two transpondors, there still exists a surface which may be charted for navigational

2 purposes and on any point of which the two response signals will be received at the same instant, provided that the difference in the delays introduced at the two beacons does not exceed the time of signal transmission along the line connecting the two beacons.

Although transpondor systems of the type described are satisfactory for many applications, the indications produced on the display device may not be adequate under certain conditions of operation of such systems. This may be true particularly when it is desired to observe rather small deviations of the mobile object from a path along which the two response signals are received at the same instant, which may be the case when it is desired to guide the mobile object accurately along such a path. Under these conditions the display device attempts to form two indications at or nearly at the same point on the time base. In doing this the two indications may become partly or completely merged.

Illustrative of the way in which such deterioration of the indications may occur, the circuits for translating response signals of pulse wave form received at the mobile object may include a limiting circuit to obtain translated signals of constant amplitude for producing indications of a desirable steadiness. If then two response signals overlap at all in their times of reception, the receiving circuits translate a single signal of pulse wave form commencing with the start of the first received signal and finishing with the end of the second received signal. It is difficult to determine by viewing the resulting indication the difference in the times of arrival of the two signals, and it is practically impossible to determine by such observation which of the two response signals arrived first and thus to observe the sense of a deviation from the desired course. Even when the response-receiving circuits do not limit the amplitudes of the translated signals to such an extent, it nevertheless may be difficult to determine from the indications the position or direction of motion of the mobile object with the desired ease and accuracy.

It is an object of the present invention, therefore, to provide a new and improved transpondor system which substantially avoids one or more of the limitations of the described prior arrangement.

It is a further object of the invention to provide a new and improved transpondor system in which the responses from two transpondor beacons are displayed or otherwise indicated with improved clarity.

It is a still further object of the invention to provide a transpondor system for indicating the direction followed by a mobile object in which two response signals received from two beacons almost equidistant from the mobile object may be displayed without uncertainty as to the difference, if any, in the times of arrival of the two response signals and preferably without ambiguity between the two signals.

In accordance with the invention, a transpondor system comprises two relatively fixed spaced wave-signal beacons adapted to receive an interrogating modulated wave signal of predetermined frequency and each so constructed as to be responsive to an individual different coding of the modulation signal of the aforementioned wave signal for individually transmitting response wave signals. The system includes a transmitter spaced from the beacons for transmitting the aforementioned interrogating modulated wave signal of the aforesaid frequency and having the aforesaid modulation-signal coding which during successive operating intervals of the transmitter causes the beacons individually and successively to respond thereto to transmit the response wave signals in succession, an indicator means coupled to the transmitter and having operating cycles occurring in timed relation to the modulation-signal components of the interrogating wave signal for providing indications of the response signals. The system also includes a control system for causing the indicator means to produce during the aforesaid successive operating intervals, but in correlated relation, individual ones of the response signals to indicate the differences in the times of signal travel between the transmitter and each of the two beacons.

For a better understanding of the present invention, together with other and further objects thereof, reference is had to the following description taken in connection with the accompanying drawings, and its scope will be pointed out in the appended claims.

Figure 2:
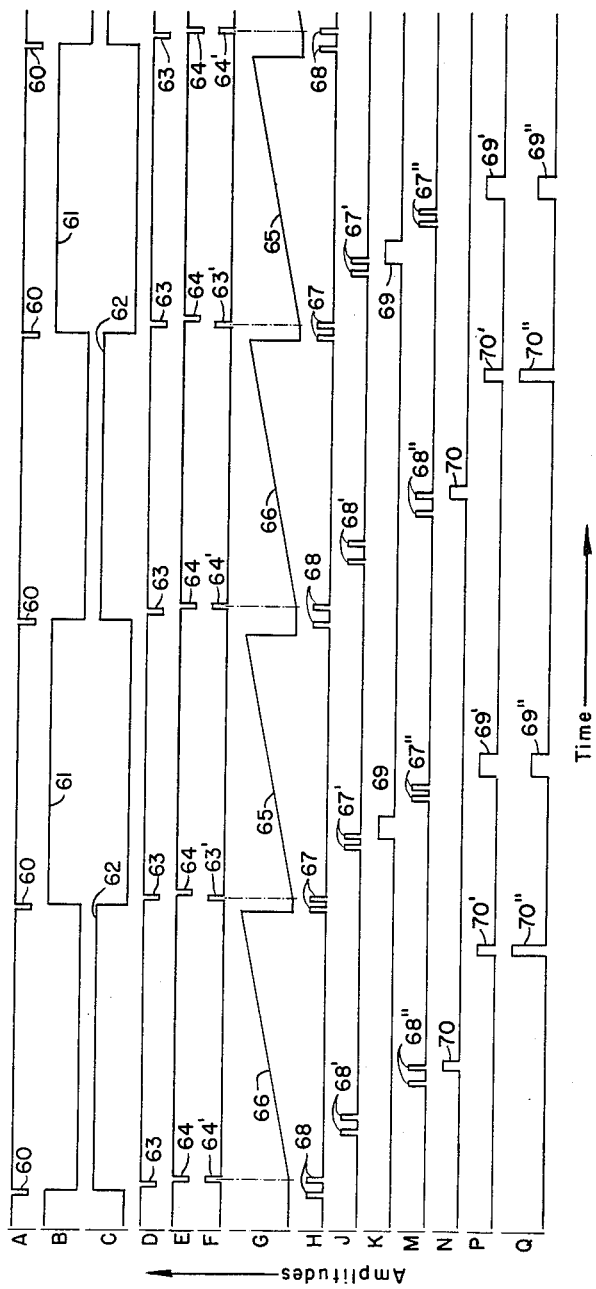

In the drawings, Fig. 1 is a circuit diagram, partly schematic, of a complete transpondor system embodying the invention; Fig. 2 is a series of graphs having a common time scale and representing the signals produced in various parts of the transpondor system of Fig. 1; and Figs. 3, 4, and 5 illustrate types of displays obtained with the transpondor system of Fig. 1 under certain representative conditions of its operation.

In the transpondor system of the present invention, means ordinarily are provided for producing separate indications of two transpondor beacons in a sequence. This may be accomplished by coding the signals passing from the mobile object to the beacon and back again, using signal characteristics designating each of the beacons in a sequence. Furthermore, this coding may be applied either to the signals passing from the mobile object to the beacon or to the signals passing from the beacon to the mobile object in response thereto. In the former case the signals are decoded at each of the beacons, which then respond one at a time in a sequence. In the latter case pairs of coded response signals, received from the two beacons at rather closely spaced times or even simultaneously, are decoded at the mobile object in a sequence, only one of each pair of response signals being used. However, a transpondor system in which the first signals, those passing from the mobile object to the beacons, are coded is preferred, and for this reason this system will be described.

Referring now to Fig. 1 of the drawings, there is illustrated, largely in the form of a block diagram, a transpondor system for indicating the direction followed by a mobile object. The system comprises interrogator means on the mobile object including, connected in tandem, a negative-pulse generator 11, an amplifier and polarity inverter 12, and an interrogator transmitter 13. Auxiliary to this interrogator means, and having input circuits connected to the output circuits of pulse generator 11, are a switching means indicated generally as 14, delay circuit 15, and delay circuit 16. Delay circuits 15 and 16 are provided for the purpose of furnishing the signals produced by the interrogator means with code characteristics designating each of several transpondor beacons. When the transpondor system is used to define a navigable course two beacons may be used, one located to the left and the other located to the right of the course defined by the system. These beacons then may be referred to as the left, or "L" beacon and the right, or "R" beacon. Accordingly, delay circuit 15 may be used for furnishing the L code characteristic and delay circuit 16 for furnishing the R code characteristic, designating respectively the left and right beacons. The output circuits of delay circuits 15 and 16 are connected to input circuits of switched repeater and inverter units 17 and 18, respectively. Switching means 14 has output circuits connected to appropriate control circuits in the switched repeaters 17 and 18. Units 17 and 18 have output circuits connected together and to the input circuit of an amplifier and wave shaper 19, the output circuit of which is connected to an input circuit of interrogator transmitter 13.

Within range of interrogator transmitter 13 are two relatively fixed wave-signal transpondor beacons spaced apart from each other, a left beacon 21 and a right beacon 22. The left beacon 21 includes a receiver and "L" decoder 23 having an output circuit connected to the reply transmitter 24 of the beacon. To distinguish the reply signals transmitted by beacon 24 these signals, if of pulse wave form, may be given an "L" pulse duration, peculiar to the left or L beacon. Likewise, transpondor beacon 22 includes a receiver and "R" decoder unit 25 and the reply transmitter 26 of the R beacon, the latter being arranged to transmit pulses of "R" duration designating the R beacon.

Associated with the interrogator means and located near that means on the mobile object is an indicator means including, connected in tandem, a wave-signal receiver 28, limiter circuit 29, and a controllable gain amplifier 30. The indicator means also includes a triggered sweep-signal generator 31 whose input circuit is connected to the common output circuit of switched repeaters 17 and 18. The indicator means further includes a cathode-ray beam device 32 having a pair of horizontal beam-deflecting elements 34, 35 and a pair of vertical beam-deflecting elements 36, 37. The output circuit of amplifier 30 is connected to the horizontal deflecting elements 34, 35, the element 35 being grounded. The output circuit of sweep-signal generator 31 is connected to the vertical deflecting elements 36, 37, the element 37, however, being grounded through a source 38 of positive biasing voltage. In addition, the cathode-ray tube 32 has the customary display screen 39.

For simplicity of illustration, antenna systems associated with interrogator transmitter 13, beacon receivers 23, 25 and transmitters 24, 26, and reply receiver 28 have been shown schematically connected to the corresponding units. The interrogator means and the indicator means, being located on the mobile object, are spaced from the transpondor beacons 21 and 22. The plane which includes the perpendicular bisectors of a line connecting the transpondors 21 and 22 intersects Fig. 1 along a line 40. Line 40 hence is a projection on Fig. 1 of the course followed by a mobile object receiving simultaneously the reply signals from the two beacons, assuming equal inherent delays in the two transpondor beacons. It appears from Fig. 1 that the antennas of transmitter and receiver units 13 and 28 on the mobile object lie to the left of the course 40.

Completing the description of the Fig. 1 arrangement, the switching means 14 in the arrangement of Fig. 1 comprises two triode vacuum tubes 41, 42 with grounded cathodes, with control electrodes interconnected through resistors 43 and 44 respectively, and with anode electrodes interconnected through resistors 46 and 47, respectively. The point common to resistors 43 and 44 is grounded through a source 45 of negative biasing voltage. The point common to anode resistors 46 and 47 is connected through a resistor 48 to a source of space current 49. The anode of tube 41 is connected to the control electrode of tube 42 through a coupling resistor 51 by-passed by a condenser 52, while the anode of tube 42 is connected to the control electrode of tube 41 through a coupling resistor 53 by-passed by a condenser 54. The output circuit of pulse generator 11 is coupled to the switching means 14 through a coupling condenser 56 connected to the point common to resistors 46, 47, and 48. The anodes of tubes 41 and 42 are connected through coupling condensers 57 and 58, respectively to the control circuits of switched repeaters 17 and 18, respectively.

Operation of the Fig. 1 arrangement will be described with reference to the graphs of Fig. 2, in which are represented on convenient vertical scales, as functions of time on a horizontal scale, the approximate amplitudes of the voltages appearing in the output circuits of the various units comprising the transpondor system. The graphs are identified hereinbelow by reference letters appearing at the left of each graph. Negative-pulse generator 11 generates a series of pulses of negative polarity illustrated in graph A at 60. These pulses may occur at random intervals, but are illustrated as recurring with a fixed periodicity. The pulses are amplified and reversed in polarity in unit 12 and applied with negligible time delay to modulate a carrier wave generated in the interrogator transmitter 13.

The negative pulses generated in unit 11 also are applied through coupling condenser 56 to two parallel circuits in switching means 14. One of these circuits includes anode resistor 46, by-pass condenser 52, and the resistor 44 in the control-electrode circuit of tube 42, while the other circuit comprises anode resistor 47, by-pass condenser 54, and the resistor 43 in the control-electrode circuit of tube 41. Resistors 44 and 43 are large compared with resistors 46 and 47. The switching operation may be described by assuming that, at the time a particular negative pulse is applied to the switching means, tube 41 is not conducting so that its anode voltage is high, and tube 42 is conducting so that its anode voltage is low. Since anode current in tube 41 is already cut off, the negative pulse appearing across resistor 43 has no effect on this tube. However, the same negative pulse appearing across resistor 44 causes the space current in tube 42 to decrease rapidly. The corresponding increase in the anode voltage of tube 42 is coupled through coupling resistor 53 to the control electrode of tube 41, causing this electrode to assume a positive potential. Thereupon space current starts to flow in tube 41, resulting in a sharp drop in its anode voltage. This drop is coupled through coupling resistor 51 to the control electrode of tube 42 as an amplified negative voltage strongly reinforcing the negative voltage appearing across resistor 44 as a result of the pulse applied from pulse generator 11. Consequently, tube 42 is carried rapidly to anode-current cutoff, and a positive voltage appears on its anode while a relatively negative voltage appears on the anode of tube 41.

This condition of the switching means 14 remains unchanged until the next negative pulse is applied to it through coupling condenser 56, at which time this pulse causes the anode current of tube 41 to decrease, so that its anode assumes a more positive voltage. This positive voltage is coupled to the control electrode of tube 42 with consequent increase in its anode current. In this way the anodes of each tube again suffer sharp changes, tending rapidly to bring tube 41 to anode-current cutoff and to increase anode current in tube 42 to a maximum. Thus the anode of tube 41 again assumes a high positive potential, while the anode potential of tube 42 becomes relatively negative. These anode potentials reverse every time a negative pulse is applied to switching means 14. The anode voltages of tubes 41 and 42 are represented in Fig. 2 by graphs B and C, respectively, which illustrate the respective alternate positive pulses 61 and 62 applied to the switched circuits of repeaters 17 and 18, respectively.

The negative pulses 60 from generator 11 also are applied to delay circuits 15 and 16, in which, after delays determined by the L and R codes, respectively, the pulses emerge as shown at 63 in graph D and at 64 in graph E, respectively. The graphs indicate that the R-code delay is greater than the L-code delay. In the units 17 and 18 the polarity of the pulses 63 and 64 is reversed. However, pulses 63 having a delay corresponding to the L code are translated through unit 17 only when that unit is switched on by the positive switching signal 61, at which time positive pulses 63', illustrated in graph F, corresponding to delayed pulses 63 appear with negligible further delay in the common output circuit of units 17 and 18. Likewise, negative pulses 64 having a delay corresponding to the R code are translated from unit 16 through unit 18 only during the positive switching signals 62 to produce with negligible further delay the pulses 64' in the output circuits of units 17 and 18, illustrated in graph F. Accordingly, graph F illustrates alternate positive pulses 63' and 64' having delays relative to pulses 60 corresponding to the L and R codes, respectively.

Each of the delayed pulses 63' and 64' is applied to the sweep-signal generator 31. Generator 31 is a means for supplying to the vertical beam-deflecting element 36 a series of substantially identical linear sweep signals, illustrated in graph G. The generator 31 is triggered by pulses 63' to form the sweep signals 65 and by pulses 64' to form the sweep signals 66, the respective sweep signals starting, with reference to the leading edges of pulses 63' and 64', after a very short time delay inherent in the triggering circuits. These sweep signals serve to produce successive sweeps of the cathode-ray beam in tube 32 vertically upward. Each sweep is initiated with the cathode-ray beam focused on substantially the same datum position on the lower part of display screen 39, this position being determined by the bias applied by battery 38 to beam-deflecting element 37. Since the sweep signals are substantially identical and start at the same datum position, the successive paths followed by the successive sweeps of the cathode-ray beam in the vertical direction are substantially aligned on the display screen 39.

The delayed pulses 63' and 64' also pass through the amplifier and wave-shaper unit 19, after which they are combined with the pulses translated directly through unit 12 from the pulse generator. Thus, as illustrated in graph H, there are formed pairs of positive pulses 67, separated by a time interval designating the left beacon, alternating with pairs of positive pulses 68 separated by a time interval designating the right beacon. Since the delay circuits 15 and 16 may cause some degradation of the pulse wave form, wave-shaper circuits such as amplifier and limiter circuits in unit 19 ensure that the second pulse of each pair 67 and 68 has leading and trailing edges of steepness comparable to that of the leading and trailing edges of the first pulse of each pair. Both pulses of the pairs of pulses 67 and 68 modulate the carrier wave generated in interrogator transmitter 13.

After an interval of time proportional to the distance between the mobile object and the left transpondor beacon 21, the coded pulses 67 and 68 are intercepted at receiver unit 23, as illustrated in graph J at 67' and 68', respectively. Unit 23 contains a decoder circuit which translates the pairs of pulses 67' coded for the L beacon but rejects the pairs of pulses 68' coded for the R beacon. Any suitable decoding device may be used, and one such device will now be described.

In one form of decoder circuit the first of each pair of pulses is used to cause the generation of a single rather long pulse in a well-known keyed pulse-generation circuit arrangement which may be called a univibrator. The length of the pulse thus generated is determined by circuits having a time constant which is adjusted according to the pulse separation to be decoded. After an interval of time determined by this time constant the pulse generated in the univibrator ceases, and this pulse may be applied to a conventional differentiating circuit to obtain two impulses of opposite polarity. The impulse corresponding to the trailing edge of the pulse generated by the univibrator is used to place a trigger amplifier in an operative condition for a short period of time. If the leading edge of the second pulse of a pair of interrogating pulses arrives at the trigger amplifier during this period of time, the first portion of the second pulse is amplified and applied to modulate the carrier signal generated in the reply transmitter 24, producing a reply signal of pulse wave form. Suitable decoder circuits of the form described are illustrated in Fig. 6 of an application Serial No. 617,020, filed September 18, 1945, now abandoned; univibrator and associated circuits suitable for inclusion in the decoder circuits are shown in detail in Fig. 4 of the same application.

Further to identify the reply pulse with the L beacon, the trigger amplifier may be adjusted to apply a pulse of rather long duration to the modulation circuits of the reply transmitter. Such a reply pulse is illustrated at 69 in graph K.

After a somewhat longer interval determined by the relatively great distance of the right transpondor beacon 22 from the mobile object the pairs of interrogating pulses are received at that beacon, as illustrated at 67'' and 68'' in graph M. Here, however, the receiver and R decoder 25 translates only the pairs of pulses 68'' separated by the relatively long coding interval designating the R beacon. The leading edge of the second pulse of each pair 68'' triggers the reply transmitter 26, which after a very slight inherent delay radiates a pulse of relatively short duration further to identify the pulse as originating at the R beacon. This reply pulse is illustrated at 70 in graph N.

After additional intervals of time corresponding to the respective distances of the two beacons from the mobile object the reply signals 69 and 70 are intercepted by receiver 28, as illustrated, insofar as the time relationships of the signals are concerned, by the corresponding pulses 69' and 70', respectively, in graph P. However, individual ones of the signals 69' and also of the signals 70' may vary in amplitude due to varying conditions of wave-signal transmission between the mobile object and the beacons; moreover, differences in the distances of the mobile object from the two beacons tend to cause the signal 69' to have a greater average amplitude than the signal 70'. After translation through limiter 29, however, the amplitudes of all the signals 69' and 70' are approximately the same, as illustrated in graph P. The signals 69' are translated through the controllable gain amplifier 30 to produce signals 69'' illustrated in graph Q which are applied with somewhat low amplitude to the horizontal deflection element 34.

One form of controllable gain circuit suitable for use in amplifier 30 comprises a vacuum-tube amplifier having a control-electrode circuit biased beyond anode-current cutoff, so that only the tops of the amplitude-limited pulses 69' cause the amplifier to translate the pulses 69'' of rather long duration identifying the L beacon. Hence pulses 69' have a somewhat low amplitude. However, during the alternate periods following the transmission of the pairs of interrogating pulses 68, coded for the R beacon, the positive switching signal 62 may be applied to the amplifier to decrease the bias in the control-electrode circuit, thus effectively increasing the gain of the amplifier when the relatively short amplitude-limited pulses 70', corresponding to the R beacon, are applied to it. The resulting pulses 70'' applied to the beam-deflecting element 34 may have twice the amplitude of the pulses 69'', as illustrated in graph Q.

Accordingly, the units 11, 12 and 13 comprise interrogator means for transmitting interrogating signals 67 and 68 to actuate both of the transpondor beacons 21 and 22 and to obtain response signals 69 and 70 therefrom. Each of the interrogating signals has a plurality of waveform portions, including the leading and the trailing edges of each pulse of the pair of pulses comprising the interrogating signal. The delay circuits 15 for the L code and the corresponding switched repeater 17, the delay circuits 16 for the R code and the corresponding switched repeater 18, and the amplifier 19 constitute a first controlled means for conditioning the interrogator means to furnish the interrogating signals with either of two pulse-separation characteristics designating respective ones of the beacons 21 and 22, specifically a small pulse separation designating beacon 21 or a large pulse separation designating beacon 22. The controllable gain circuit of amplifier 30 forms a second controlled means, illustrated as a means for conditioning the indicator means including units 28—32, inclusive, to provide signals of either of two different types, specifically signals 69" of somewhat low amplitude or signals 70" of relatively high amplitude. The switching means 14 serves for controlling the first and the second controlled means just referred to in order to condition the interrogator means to furnish alternately the two interrogating signal characteristics and in order synchronously to condition the indicator means to provide alternately the two types of signals 69" and 70".

Fig. 3 illustrates the operation of display screen 39 and the other components of the indicator means for providing visual indications of the response signals 69" and 70" developed in the output circuit of amplifier 30. Fig. 3 shows the face of display screen 39, on which the vertical line 71 is traced by successive sweeps of the cathode-ray beam. A horizontal reference line 72 passes through the datum or starting position of the sweep 71. The response signal 69" translated through amplifier 30 with relatively low amplitude and having a rather long duration corresponding to the L beacon is applied to horizontal deflection element 34 when the sweep signal 65 has attained about half its maximum amplitude, as a comparison of graphs G and Q will reveal. Hence a corresponding pulse L appears in Fig. 3 about half way up the vertical sweep 71. Likewise, the response signal 70" translated through amplifier 30 with relatively high amplitude and having a rather short duration corresponding to the R beacon is applied to horizontal deflection element 34 when the corresponding sweep signal 66 has attained almost maximum amplitude. Hence the resulting indication R appears near the top of the sweep 71. The indication L of the left beacon, by virtue of its greater dimension lengthwise of the sweep 71 and its smaller horizontal dimension corresponding to its low amplitude, is clearly distinguishable from the indication of the R beacon. The leading or lower edge of the L indication is much closer to the reference line 72 than the leading or lower edge of the R indication, showing that the mobile object is correspondingly nearer to the L beacon. This indicates that the mobile object is considerably off the course 40 and to the left of the course.

Figs. 4 and 5 show the indications that are produced on display screen 39 as the mobile object moves to the right and toward the beacon. The sweep 71 and reference line 72 appear as in Fig. 3. In Fig. 4 the mobile object has moved somewhat closer to the L beacon and much closer to the R beacon, and has just reached an on-course position along line 40. The leading edges of the corresponding indications L' and R' coincide due to the equal times of signal travel to and from the two beacons. The different amplitudes of the two indications, aided by their different durations, facilitate distinguishing the L' and R' indications. Nevertheless, were the distinguishing characteristics to be omitted by eliminating amplifier 30 and using identical trigger pulses in the two beacons, the observer could deduce easily from the exact superposition of the L' and R' indications that the mobile object is on course. Since the two indications are produced on separate sweeps 71, a slight deviation from the on-course position causes the leading edges of the indications to occupy two distinct and well-defined positions. The two indications are distinguishable as soon as any deviation from course causes a separation of the leading edges greater than the diameter of the spot of light generated by the cathode-ray beam on the display screen at any instant. When the controllable gain amplifier 30 is used, the two indications may be distinguished at even smaller deviations by a gradation of the thickness of the leading edges to the left and right of the vertical line produced in the indication L'. Of course, such accuracy of indication requires a steady sweep-biasing voltage from battery 38 and a stable sweep-signal generator.

If the mobile object continues to approach the two beacons but swings somewhat to the right of the course 40, the display shown in Fig. 5 warns of this deviation from the course. Both of the indications L" and R" of the L and R beacons are closer to reference line 72 than the corresponding indications in Fig. 4, in proportion to the approach of the mobile object to both beacons. However, the leading edge of the indication R" is somewhat closer than the leading edge of the indication L", indicating that the mobile object is somewhat off-course to the right. The ease with which the two indications may be distinguished is evident from the display shown in Fig. 5. Accordingly, the transpondor system is a system for indicating the direction followed by the mobile object carrying the interrogator and indicator means.

Referring to curves F, G, and H of Fig. 2, it appears that the indicator means has operating cycles in the form of sweeps of the cathode-ray beam produced by sweep signals 65 and 66 responsive to the second pulses 63' and 64' of each pair of interrogating-signal pulses 67 and 68. These operating cycles are initiated in a predetermined fixed time relationship to the transmission of corresponding ones of the interrogating signals. As described above, the leading edge of the second pulse of each pair of interrogating pulses triggers the reply transmitter of the corresponding beacon. The sweep signals 65 and 66 also are initiated by the leading edges of these same interrogating pulses 63' and 64'. Hence an operating cycle is initiated by, in each of the interrogating signals, the last occurring one of the wave-form portions thereof necessary to obtain the response signal.

As illustrated in Figs. 3, 4, and 5 the two different types of response signals 69" and 70", produced by controlling the gain of amplifier 30 to provide different amplitudes, are utilized in the cathode-ray tube 32 to provide either of two types of indications having correspondingly distinguishable horizontal dimensions. The L and R decoders in the respective transpondor receivers 23 and 25 constitute means for using the pulse-spacing characteristics of the interrogating signals to obtain response signals from each of the beacons in a sequence determined by the conditioning of the interrogator means which causes the latter to produce one or the other of the pulse spacings. The response signals are obtained in such a sequence as to cause the indicator means to produce during each one of its operating cycles an indication, distinguishable as between the two types of amplitudes of the indications corresponding to each of the two beacons, of the response signal from only the one of the beacons then designated by one of the pulse-spacing characteristics. Since the sweep signals 65 and 66 are linear and substantially identical to each other, the successive aligned sweeps 71 of the cathode-ray beam are correlated as to the elapsed time following the transmission of each of the corresponding interrogating signals. Consequently, the left and right indications shown in Figs. 3, 4, and 5 are also correlated to indicate the difference in the times of signal travel between the interrogator means and each of the beacons. Knowing the scale of the time base formed by sweeps 71, the difference in the times of signal travel may be determined simply by measuring the vertical distance on display screen 39 between the leading edges of the right and left displays.

Units 15, 16, 17, 18, and 19 for coding the interrogating signal, the switching means 14, and the decoding circuits of units 23 and 25 co-operate to provide means for causing the indicator means to produce, for one of the beacons during one of the operating cycles of the indicator and for the other of the beacons during another of the operating cycles, the visual indications R and L on the display screen 39 correlated by the alignment of the successive paths of the sweeps along the time base to indicate the difference in the times of signal travel between each of the two beacons and the mobile object carrying the interrogator means and indicator means. The interrogating signals pass in one general direction between the interrogator means and the beacons, while the reply signals pass in the other general direction. The units of the Fig. 1 arrangement just referred to constitute means for furnishing those of such signals passing in one general direction, specifically, the interrogating signals, with characteristics designating each of the beacons in a sequence, in this case alternately, and for using these characteristics to cause the indicator means to produce during each one of its operating cycles a corresponding one of the indications, representing individually only the beacon designated by the one of the characteristics associated in the sequence with the respective one of the operating cycles. In the case of alternate L and R coding, the indicator means produces, for alternate ones of the beacons during corresponding operating cycles, the corresponding indication.

Since the interrogating signals are coded, the coding characteristics are used to obtain response signals from each of the beacons in the coding sequence so as to cause the indicator means to produce during each sweep an indication of the response signal from only the one of the beacons then so designated in the sequence. The coding characteristic with which each of the interrogating signals is furnished is a modulation wave-form characteristic comprising a pair of pulse wave forms separated by an interval of time having for different interrogating signals one of two durations designating respectively one and the other of the beacons in the alternating sequence, and the decoders in the beacons distinguish between the two durations of the modulation wave-form characteristics.

In the system described hereinabove, the characteristics furnished the interrogating signal require the use of only one carrier-wave frequency. Using the same carrier-wave frequency the delay circuits 15 and 16 may be adjusted to cause the interrogator means to challenge another pair of beacons also within range of the mobile object and adapted to reply with two other distinguishable pulse-separation characteristics. In transpondor systems of the type described it may be convenient, however, to transmit all the reply signals on a different carrier-wave frequency.

In accordance with a preferred method of using the transpondor system of the present invention, visual indications are obtained on display screen 39 of the response signals including such indications of the response signals from both of the beacons substantially coincident in position on the screen, as shown in Fig. 4, signifying that the desired direction is being followed by the mobile object. Thus the indications are correlated to indicate by any deviations from this substantial coincidence in position on the display screen a difference in the times of signal travel, as shown in Fig. 3 or Fig. 5, signifying a corresponding deviation from the direction desired to be followed by the mobile object. However, it is noted that the displays illustrated in Figs. 3, 4, and 5 may be used to obtain the sum of the round-trip times of signal travel between the interrogator transmitter and each of the transpondor beacons, this sum being proportional to the distance on screen 39 from reference line 72 to the lower edge of the L indication plus the distance from line 72 to the lower edge of the R indication. Likewise, the distance between the lower edges of the L and R indications is proportional to the difference of the round-trip times of signal travel. For given locations of the two transpondor beacons a family of elliptical surfaces of revolution may be charted for navigational use, each such surface being the locus of points which may be occupied by the mobile object for a given sum of the times of signal travel. Likewise, if only the difference in the times of signal travel is to be measured, a corresponding family of hyperbolic surfaces of revolution may be charted, or the intercepts of these surfaces of revolution may be plotted on maps in known manner for navigational use. By such means directions other than the direction corresponding to equal times of signal travel may be followed accurately by the mobile object. The amplitude distinction between the L and R indications, as provided by the preferred embodiment of the present invention, eliminates the left-right ambiguity otherwise inherent in transpondor systems of the type described.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A transpondor system comprising: two relatively fixed spaced wave-signal beacons adapted to receive an interrogating modulated wave signal of predetermined frequency and each so constructed as to be responsive to an individual different coding of the modulation signal of said wave signal for individually transmitting response wave signals; a transmitter spaced from said beacons arranged to transmit said interrogating modulated wave signal of said frequency and having said modulation-signal coding which during successive operating intervals of said transmitter causes said beacons individually and successively to respond thereto to transmit said response wave signals in succession; indicator means coupled to said transmitter and arranged to have operating cycles occurring in timed relation to the modulation-signal components of said interrogating wave signal for providing indications of said response signals; and a control system arranged to cause said indicator means to produce during said successive operating intervals, but in correlated relation, individual ones of said response signals to indicate the differences in the times of signal travel between said transmitter and each of said two beacons.

2. A transpondor system comprising: two relatively fixed spaced wave-signal beacons adapted to receive an interrogating modulated wave signal of predetermined frequency and each so constructed as to be responsive to an individual different coding of the modulation signal of said wave signal for individually transmitting response wave signals; a transmitter spaced from said beacons arranged to transmit said interrogating modulated wave signal of said frequency and having said modulation-signal coding which during alternate operating intervals of said transmitter causes said beacons individually and alternately to respond thereto to transmit said response wave signals in succession; indicator means coupled to said transmitter and arranged to have operating cycles occurring in timed relation to the modulation-signal components of said interrogating wave signal for providing indications of said response signals; and a control system arranged to cause said indicator means to produce during said alternate operating intervals, but in correlated relation, individual ones of said response signals to indicate the differences in the times of signal travel between said transmitter and each of said two beacons.

3. A transpondor system comprising: two relatively fixed spaced wave-signal beacons adapted to receive a pulse-modulated interrogating wave signal of predetermined frequency and each so constructed as to be responsive to an individual different coding of the modulation signal of said wave signal for individually transmitting pulse-modulated response wave signals; a transmitter spaced from said beacons arranged to transmit said pulse-modulated interrogating wave signal of said frequency and having said pulse-modulation-signal coding which during successive operating intervals of said transmitter causes said beacons individually and successively to respond thereto to transmit said response wave signals in succession; indicator means coupled to said transmitter and arranged to have operating cycles occurring in timed relation to the pulses of said interrogating wave signal for providing indications of said response signals; and a control system arranged to cause said indicator means to produce during said successive operating intervals, but in correlated relation, individual ones of said response signals to indicate the differences in the times of signal travel between said transmitter and each of said two beacons.

4. A transpondor system comprising: two relatively fixed spaced wave-signal beacons adapted to receive a paired pulse-modulated wave signal of predetermined frequency and each so constructed as to be responsive to an individual different value of spacing between the paired pulses of said wave signal for individually transmitting response wave signals; a transmitter spaced from said beacons arranged to transmit said paired pulse-modulated interrogating wave signal of said frequency and having said paired pulse spacings which during successive operating intervals of said transmitter cause said beacons individually and successively to respond thereto to transmit said response wave signals in succession; indicator means coupled to said transmitter and arranged to have operating cycles occurring in timed relation to the pulse-modulation-signal components of said interrogating wave signal for providing indications of said response signals; and a control system arranged to cause said indicator means to produce during said successive operating intervals, but in correlated relation, individual ones of said response signals to indicate the differences in the times of signal travel between said transmitter and each of said two beacons.

5. A transpondor system comprising: two relatively fixed spaced wave-signal beacons adapted to receive a paired pulse-modulated wave signal of predetermined frequency and each so constructed as to be responsive to an individual different value of spacing between the paired pulses of said wave signal for individually transmitting response wave signals; a transmitter spaced from said beacons arranged to transmit said paired pulse-modulated interrogating wave signal of said frequency and having said paired pulse spacings which during successive operating intervals of said transmitter cause said beacons individually and successively to respond thereto to transmit said response wave signals in succession; indicator means coupled to said transmitter and arranged to have operating cycles occurring in timed relation to the last pulse of each pair of pulses of said interrogating wave signal for providing indications of said response signals; and a control system arranged to cause said indicator means to produce during said successive operating intervals, but in correlated relation, individual ones of said response signals to indicate the differences in the times of signal travel between said transmitter and each of said two beacons.

6. A transpondor system comprising: two relatively fixed spaced wave-signal beacons adapted to receive a paired pulse-modulated wave signal of predetermined frequency and each so constructed as to be responsive to an individual different value of spacing between the paired pulses of said wave signal for individually transmitting response wave signals; a transmitter spaced from said beacons arranged to transmit said paired pulse-modulated interrogating wave signal of said frequency and having said paired pulse spacings which during alternate operating intervals of said transmitter cause said beacons individually and alternately to respond thereto to transmit said response wave signals alternately; indicator means coupled to said transmitter and arranged to have operating cycles occurring in timed relation to the pulse-modulation-signal components of said interrogating wave signal for providing indications of said response signals; and a control system arranged to cause said indicator means to produce during said alternate operating intervals, but in correlated relation, individual ones of said response signals to indicate the differences in the times of signal travel between said transmitter and each of said two beacons.

CHARLES J. HIRSCH.

REFERENCES CITED

The following references are of record in the file of this patent:

UNITED STATES PATENTS

| Number | Name | Date |
|---|---|---|
| 2,403,600 | Holmes et al. | July 9, 1946 |
| 2,405,238 | Seeley | Aug. 6, 1946 |
| 2,426,218 | Hopgood | Aug. 26, 1947 |
| 2,427,220 | Luck | Sept. 9, 1947 |
| 2,433,341 | Busignies | Dec. 30, 1947 |
| 2,448,016 | Busignies | Aug. 31, 1948 |
| 2,449,977 | Busignies | Sept. 28, 1948 |
| 2,480,123 | Deloraine | Aug. 30, 1949 |
| 2,483,097 | McIlwain | Sept. 27, 1949 |
| 2,495,737 | Labin | Jan. 31, 1950 |